US007103559B2

(12) United States Patent
Worthington

(10) Patent No.: US 7,103,559 B2
(45) Date of Patent: *Sep. 5, 2006

(54) SYSTEM AND METHOD FOR PERSONALIZED AND CUSTOMIZED TIME MANAGEMENT

(76) Inventor: Kathy A. Worthington, 10 Glen Avon Dr., Riverside, CT (US) 06878

( * ) Notice: Subject to any disclaimer, the term of this patent is extended or adjusted under 35 U.S.C. 154(b) by 417 days.

This patent is subject to a terminal disclaimer.

(21) Appl. No.: 10/157,088

(22) Filed: May 30, 2002

(65) Prior Publication Data

US 2002/0165753 A1 Nov. 7, 2002

Related U.S. Application Data

(63) Continuation of application No. 08/405,964, filed on Mar. 17, 1995, now Pat. No. 6,442,527.

(51) Int. Cl.
*G06F 17/06* (2006.01)
(52) U.S. Cl. ............................................. 705/8; 705/9
(58) Field of Classification Search ................ 705/1, 705/8, 9; 708/100, 112, 132–134; 345/629
See application file for complete search history.

(56) References Cited

U.S. PATENT DOCUMENTS 5,530,861 A * 6/1996 Diamant et al. ................ 705/8
5,796,951 A * 8/1998 Hamner et al. ............. 709/223
5,848,271 A * 12/1998 Caruso et al. .............. 712/220

FOREIGN PATENT DOCUMENTS

GB 2252852 A 8/1992

WO WO 96/29660 * 9/1996

OTHER PUBLICATIONS

Bethoney, Herb, discloses "Claris' Organizer for Mac puts the 'P' in PIM", PC Week, v11, n39, p. 83(2), Oct. 2, 1994, Dialog file 148, Accession No. 07538564.*
"IBM Introduces Advanced Office System US—IBM Introduces Advanced Office System", Computergram International (CGI) May 17, 1990, Dialog file 583, Accession No. 03474456.*

* cited by examiner

*Primary Examiner*—Frantzy Poinvil
(74) *Attorney, Agent, or Firm*—Michael Bednarek; Pillsbury Winthrop Shaw Pittman LLP

(57) ABSTRACT

The invention is directed to a method and system for organizing and planning various categories of events, tasks and long-term goals. The method generally includes the steps of providing at least one data module for generating data for a specific topic area of events and tasks; prompting a user to provide data based on the specific topic area of the one data module; categorizing the data inputted by the user into appointment data and task data; inputting the appointment data into a calendar framework; inputting the task data into a task list framework; and generating an output calendar and task list based on the calendar and task list frameworks. The system incorporates at least one data module for generating data for a specific category of events and tasks, means for inputting data from a user, means for processing the data inputted from the user for the data module, and means for generating an output calendar and task list. The data module includes means for prompting a user to provide data based on the specific category of events and tasks to which the data module is directed. The processing means includes means for categorizing the data inputted by the user into appointment data and task data, means for inputting the appointment data into a calendar framework, and means for inputting the task data into a task list framework.

1 Claim, 5 Drawing Sheets

MONTHLY TASK LIST
JANUARY

PERSONAL      BUSINESS      CAR

Check antifreeze

KIDS      SPOUSE      HOUSE
Register for comp      Plan a party      Clean attic
Plan summer trip      Take to dinner GARDEN
Choose seeds to plant

JANUARY 1994

| SUN | MON | TUE | WED | THU | FRI | SAT |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

| DATE | | APPOINTMENT SCHED. | | MONTH/YEAR MASTER TASK LIST | |
|---|---|---|---|---|---|
| DAY | | | | PERSONAL | BUSINESS |
| MONTH/YR. | | 8 | | NURSERY | |
| PRIORITIZED D.T. LIST | | 9 | | | |
| | | 10 | | | |
| | | 11 | | | KIDS |
| | | 12 | | | Register for spring activities |
| | | 1 | | SPOUSE | Register for camp |
| | | 2 | | Take to dinner | |
| | | 3 | | Plan romantic weekend | |
| | | 4 | | MONTHLY GOALS | HOUSE |
| | | 5 | | | Clean attic |
| | | 6 | | | |
| Kathy & Dick Anniversary | | 7 | | CAR | GARDEN |
| DAILY EXPENSE | | 8 | | Change oil | Choose seeds for spring |

SYSTEM AND METHOD FOR PERSONALIZED AND CUSTOMIZED TIME MANAGEMENT

This is a continuation of application Ser. No. 08/405,964, filed Mar. 17, 1995 now U.S. Pat. No. 6,442,527.

BACKGROUND OF THE INVENTION

Field of the Invention

The present invention relates to a system for planning and organizing day-to-day activities in an easily understandable and efficient manner. More specifically, the invention relates to a method for planning and organizing a schedule using a series of questionnaire modules to identify and plan various types of activities and events. Such activities include day-to-day occurrences (i.e., meetings, due dates), recurring events (i.e., birthdays, anniversaries), and long-term plans (i.e., goals, vacations, project completion dates).

With the hectic lifestyles imposed by today's society, most people are faced with the burden of having to divide the limited time they have each day to all the demands of work, family, community responsibility, professional development and recreation. People are burdened even more when the planning for how to divide their time includes having to identify long-term goals or tasks that do not have set timetables or completion dates. Typically, people rely on conventional paper calendars, date books, reminder notes, etc. to help keep them aware of their daily schedules and time constraints. However, such manual systems are limited to providing only the medium for displaying activities already identified and planned. These systems lack any type of mechanism or guidance for efficiently identifying, planning and coordinating events for a user. They especially lack any mechanism or guidance for efficiently identifying, planning and coordinating long-term goals or tasks having no set timetables or completion dates. Even more, these systems lack any mechanism or guidance for efficiently identifying, planning and coordinating long-term goals or tasks that must be carried over from week-to-week, month-to-month or even year-to-year; these are goals or tasks that are carried over because they are either delayed or simply recur on a regular basis.

Very often, people rely on the work of secretaries or administrative assistants to plan and maintain their schedules. Unfortunately, secretaries and administrative assistants are themselves relying on conventional paper calendars, date books, and reminder notes.

With current computer technology, software packages for calendars, date books, "day planners," etc. are readily available. However, like the manual systems, these software packages are no more than computerized versions of the conventional paper calendars, date books, and reminder notes. They too provide nothing more than a medium for displaying activities already identified and planned, albeit more efficient and visually pleasing.

SUMMARY OF THE INVENTION

In view of the problems and deficiencies in the prior art, a main object of the present invention is to provide a system for identifying and efficiently monitoring one's personal and/or professional goals.

Specifically, a main object of the present invention therefore is to provide a system for personalized and customized time management whereby a person may identify and efficiently monitor his/her personal and/or professional goals.

Another object of the invention is to provide a system of questionnaire modules for efficiently identifying, planning and coordinating not only various activities and events, but also long-term goals and tasks that have no set timetables or completion dates or that must be carried over into succeeding weeks, months or years.

Accordingly, a further object of the invention is to provide a system for generating a display of those identified activities, events, long-term goals and tasks in a calendar-style format.

An even further object of the invention is to provide a system for generating a display of the identified goals and tasks in a customized task list format.

An even further object of the invention is to provide a system for generating a display of identified activities, events, long-term goals and tasks in both a calendar-style format and a customized task list format, where the calendar and customized task lists may be generated using pertinent data from prior calendars and customized task lists.

Consequently, a further object of the invention is to provide a system for generating a display of identified activities, events, long-term goals and tasks in both a calendar-style format and a customized task list format, where the calendar and customized task lists may be generated periodically in a systematic manner.

In one aspect, the invention is directed to a method that comprises the steps of providing at least one data module for generating data for a specific topic area of events and tasks; prompting a user to provide data based on the specific topic area of the at least one data module; categorizing the data inputted by the user into appointment data and task data; inputting the appointment data into a calendar framework; inputting the task data into a task list framework; and generating an output calendar and task list based on the calendar and task list frameworks.

In a second aspect, the invention is directed to a method that comprises the steps of providing a plurality of data module, each module for generating data for a specific category of events and tasks; prompting a user to select at least one of the plurality of data modules; prompting the user to provide data based on the specific category of the at least one selected data module; inputting from the user data in response to the prompting; categorizing the data inputted by the user into appointment data and task data; inputting the appointment data into a calendar framework; inputting the task data into a task list framework; selecting a format for an output calendar and task list to be generated; and generating the output calendar and task list based on the calendar and task list frameworks, and the selected format.

In a further aspect, the invention is directed to a system that comprises at least one data module for generating data for a specific category of events and tasks, means for inputting data from a user, means for processing the data inputted from the user for the data module, and means for generating an output calendar and task list. The data module includes means for prompting a user to provide data based on the specific category of events and tasks to which the data module is directed. The processing means includes means for categorizing the data inputted by the user into appointment data and task data, means for inputting the appointment data into a calendar framework, and means for inputting the task data into a task list framework.

In an even further aspect, the invention is directed to a system that comprises a plurality of data modules, each for generating data for a specific category of events and tasks;

means for inputting data from the user including means for selecting at least one of the data modules, means for processing the data inputted from the user for the selected data module; and means for generating an output calendar and task list. Each data module includes means for prompting a user to provide data based on the specific category of the module. The processing means includes means for categorizing the data inputted by the user into appointment data and task data, means for inputting the appointment data into a calendar framework and means for inputting the task data into a task list framework.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3 illustrates an example monthly calendar and task list generated by the system and operation of the invention;

FIG. 4 illustrates an example "day planner"-style calendar and task list generated by the system and operation of the invention.

DETAILED DESCRIPTION OF THE PREFERRED EMBODIMENTS

Figure 1:
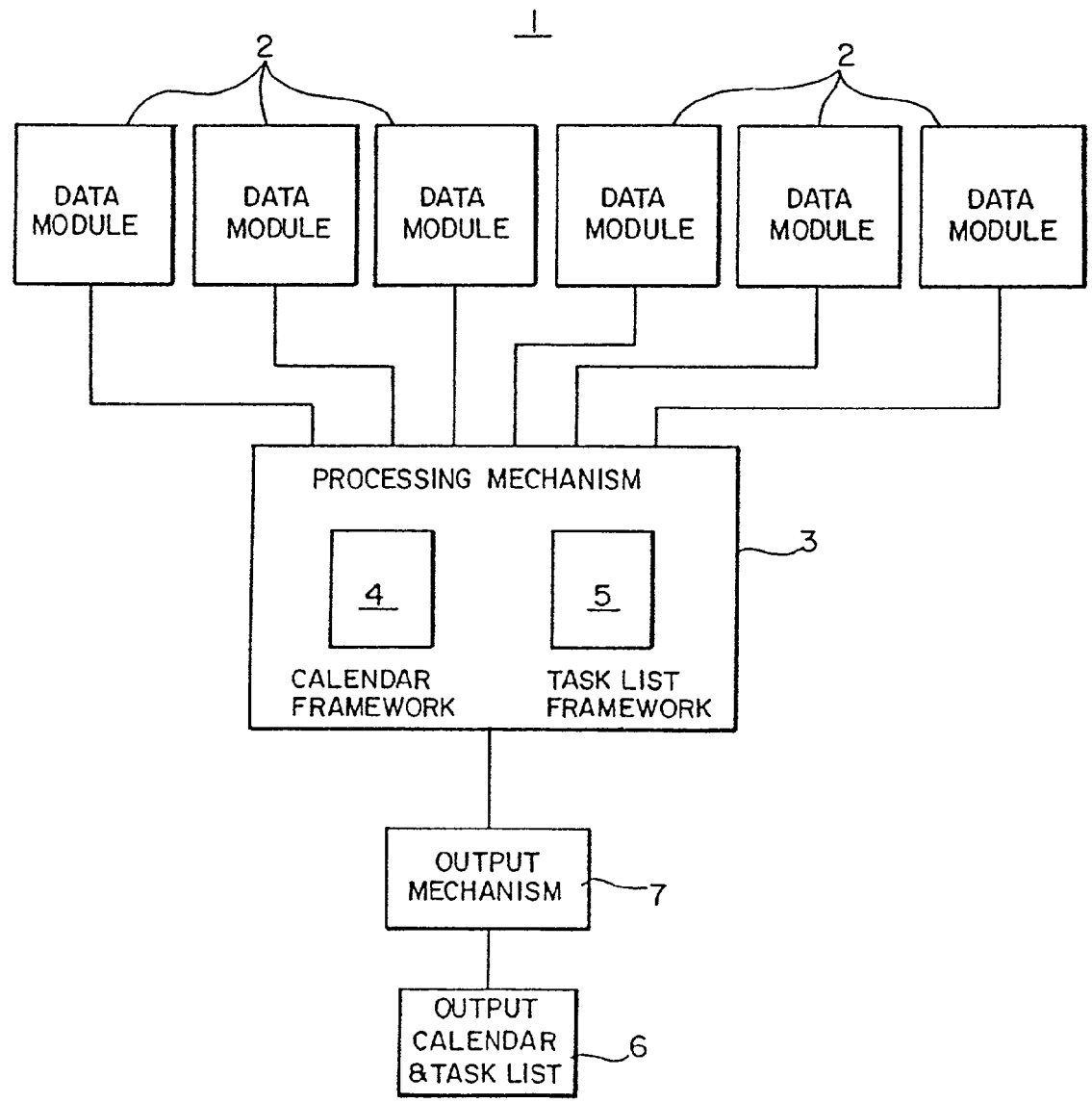
FIG. 1 illustrates a block diagram of the system of the invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

FIG. 1 illustrates a block diagram of the system of the invention. As shown, the time management system 1 of the invention incorporates a plurality of data modules 2 which provide the data for the system. The data from the modules 2 are then inputted into a data processing mechanism 3. The data processing mechanism 3 correlates the data into a calendar framework 4 and/or a task list framework 5. An output calendar and task list 6 customized to the module(s) applied, the data inputted for each module, and the type of calendar and task list desired by a user is generated by an output mechanism 7 accessed by the processing mechanism 3.

In at least a first embodiment, the system 1 of the invention is implemented through a data processing unit such as a mainframe computer, a home computer, or a laptop computer.

In a second embodiment, the system 1 is implemented through a series of hardcopy pages or panels, where each page or panel comprises one data module 2, the data processing mechanism 3, or portions of either a data module or the data processing mechanism.

Each data module 2 consists of a questionnaire-style system for collecting data. Each module is designed to collect data for a specific topic; questions in a particular module are therefore designed to elicit as much information as possible within that module's topic. Examples of the questionnaire systems of the data modules are as follows:

BIRTHDAYS Module:
Whose birthday do you wish to remember?
What is the date of the birthday?
Do you want a reminder set?
When do you want the reminder?
Do you want to send a card?
When do you want the card sent?
Do you want to call?
Do you need to get a birthday present?
When do want to go buy the present?
Does the present have to be delivered?
When does it have to be delivered?

VACATIONS Module:
What national holidays do you wish to input?
What holidays are observed by your office?
What holidays are observed by your spouse's office?
What holidays are observed by your children's schools?
When is your vacation scheduled?
Do you wish to make airline reservations?
By when should the reservations be made?
By when should the tickets be bought?
Do you wish to make hotel reservations?
By when should the hotel reservations be made?
By when should the hotel reservations be canceled if needed?
Should any services be canceled or shut off while on vacation?
When should each service be notified?
When should each service be restored?

CHILD CARE Module:
When should doctor's appointments be scheduled?
What type of doctor's appointments are being scheduled?
When should dentist's appointments be scheduled?
What type of dentist's appointments are being scheduled?
How far in advance should the appointments be made?
Do you want a reminder set?
How far in advance do you want the reminder?
Are there any special medications to take before each appointment?
Are there any special instructions to follow before each appointment?
When should the medication be taken?
When should the instructions be implemented?
When should school clothes be bought?
When should school supplies be bought?
When should the children be registered at their schools?
When should the children be registered for sports?
When should the children be registered for camp?
When should fall clothes be bought?
When should spring/summer clothes be bought?
When can the children be brought to the library?
When can the children be brought to the museum?
When can the children be brought to the zoo?
When can the children be brought to the movies?
When are the children going on field trips?
Which field trips are you accompanying them?
When are the children's sports events?
Which sports events are you attending or participating?
Do you wish reminders for their activities?
How far in advance do you want reminders?
How far in advance should you notify the office of the activities in which you are participating?

HOLIDAYS Module:
What holidays are you celebrating?
When are you celebrating?

Do you have to make special preparations for the holidays?
When should you go to the store for any supplies?
When should you begin your special preparations?
To what celebrations and/or parties are you invited?
When are the celebrations and parties?
Do you need to make special arrangements in order to attend those celebrations and parties?
Do you need to contact anyone to make special arrangements?
How far in advance of the celebrations or parties should you contact people?
GOALS Module:
What are your goals for the next 12 months?
What are your goals for the next 2 years?
What are your goals for the next 5 years?
For each of your goals, what are the interim steps you want to accomplish in order to eventually reach the final goal?
When do you expect to complete each of the interim steps?
When do you expect to reach each of your goals?
CARRY-OVER Module:
Are there any goals to carry over?
What goals must be carried over from prior weeks?
What goals must be carried over from prior months?
What goals must be carried over from prior years?
What goals must be carried over weekly?
What goals must be carried over monthly?
What goals must be carried over yearly?
When should the carry-over goals be scheduled?
Are there any tasks to carry over?
What tasks must be carried over from prior weeks?
What tasks must be carried over from prior months?
What tasks must be carried over from prior years?
What tasks must be carried over weekly?
What tasks must be carried over monthly?
What tasks must be carried over yearly?
When should the carry-over tasks be scheduled?

Examples of other modules include children's activities, office activities, car maintenance, household jobs/maintenance, gardening activities, prayer/Bible study, menu/cooking tips and planning, service club activities, community/volunteer activities, church/religious activities, and library/book reading tips.

As evident from the examples listed above, the data which the modules 2 are intended to elicit may generally be categorized as, among other things, appointment data or task data. Appointment data is defined as data describing events or planned activities that have a specific date or dates attached to them. For example, birthdays, meetings, project completion dates are appointment data. Task data is defined as data describing events and planned or intended activities that do not have a specific date or dates associated with them.

In order to process different types of data, the system includes a process for identifying the data accordingly. There exist several different techniques for identifying the data that would be known to one of ordinary skill in the art. For example, each question may be designated as an appointment or task-type question; therefore the data that is inputted as their answers are categorized accordingly. Alternatively, each question may be formatted to accept answers that may have description components and date components inputted. When the processing mechanism 3 processes all the data, the answers that include both description and date components are categorized as appointment data; the answers that only have description components are automatically categorized as task data.

Figure 2:
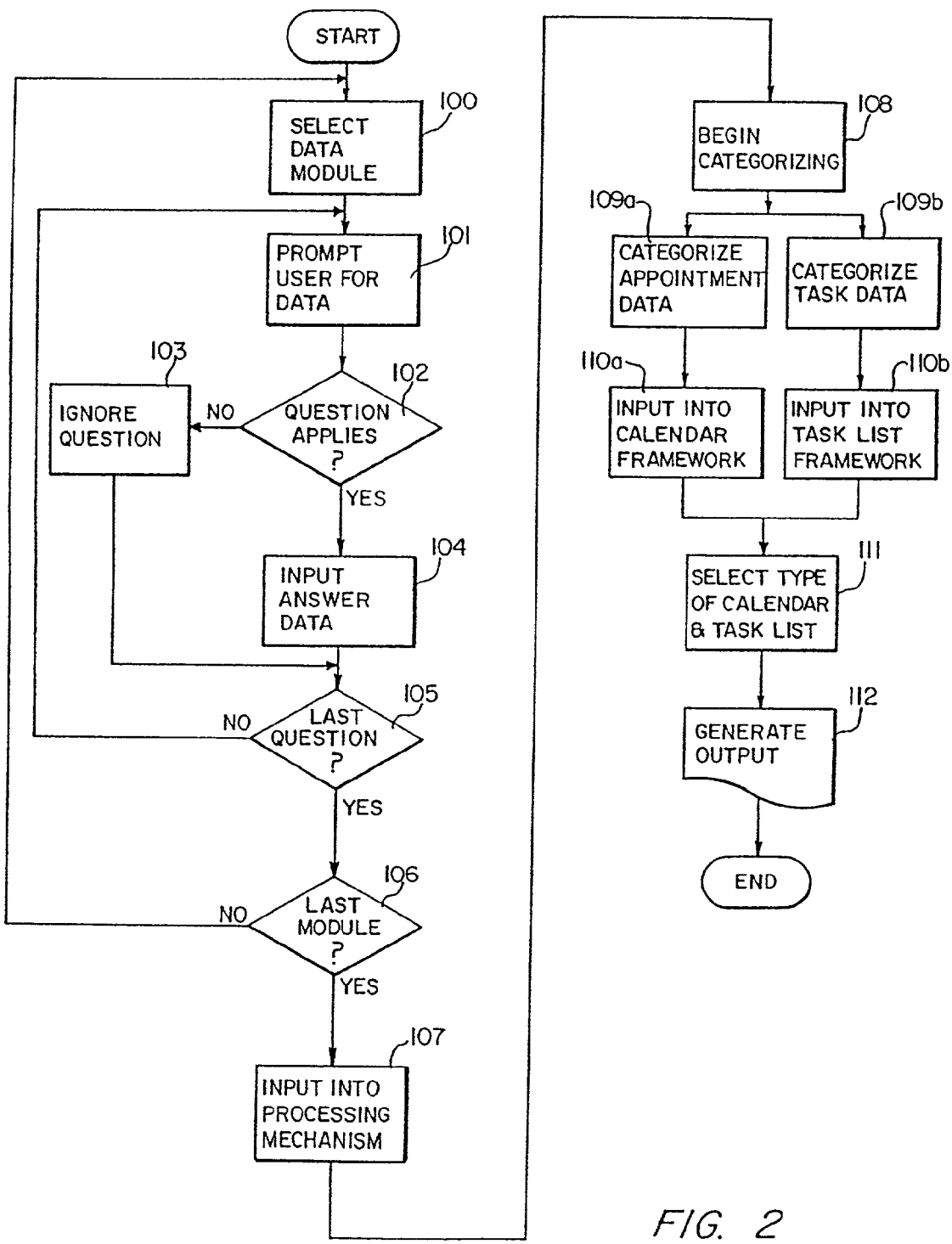
FIG. 2 illustrates a flowchart of the operation of the invention.

In operation, as illustrated in FIG. 2, the system of the invention begins with Step 100 the selection of a data module 2 with which data will be generated. With the selected data module 2, the user is then prompted for data in Step 101 in a questionnaire-style format In particular, a question is presented and then the user inputs an answer or answers to the question as required (Steps 102–104).

If some questions are not applicable to the individual user, those questions may simply be ignored; the user may input data to indicate that the question is not applicable (Steps 102–103). Such questions are not used in the processing of all data modules 2 by the processing mechanism 3.

The inputting of answers (Step 104) to each of the questions may be designed to accept fill-in-the-blank style data inputs or multiple-choice data inputs depending on which would be most appropriate to the question presented. The questions are presented and then answered until all questions in the module are answered (Steps 102–105).

When a data module 2 is completed, other data modules may then be selected (Step 106). If other data modules 2 are selected, Steps 102–105 are repeated for each module.

When all selected data modules 2 are completed, all the data is inputted into the processing mechanism 3 (Step 107). In the processing mechanism 3, all the data are categorized and divided into appointment data and task data, as discussed above (Steps 108, 109*a*, 109*b*).

In the step of processing the data, the CARRY-OVER data module shown above as an example is a particularly notable aspect of the invention. The use of the CARRY-OVER data module allows one to systematically monitor the progress and/or accomplishment of the tasks or goals identified in the module. The data for the tasks and goals for the CARRY-OVER module may be manually inputted by the user (i.e., the second embodiment of the invention), or be derived from data in other data modules.

The appointment data are inputted into the calendar framework 4 in the processing mechanism 3 (Step 110*a*). In the first embodiment of the invention, the framework 4 may be a select portion of memory reserved for organizing and storing all data to be placed in a calendar. In the second embodiment, the framework 4 may be a blank calendar form.

The task data are inputted into the task list framework 5 in the processing mechanism 3 (Step 110*b*). Similarly, the framework 5 may be another select portion of memory reserved for organizing and storing data to be placed in a task list as in the first embodiment, or a blank task list form as in the second embodiment.

In the processing mechanism 3, the data from the data modules 2 may be handled one data module at a time, or all together. In processing the data from the CARRY-OVER module, data from previously-generated calendar frameworks 4 or previously-generated task list frameworks 5 may be accessed by the processing mechanism 3. In the first embodiment, previously-generated frameworks may be stored in another select portion of memory reserved for such long-term data. In the second embodiment, such frameworks may be in the form of filled-in calendar and/or task list forms from prior months or years. Using data from such previously-generated frameworks, the processing mechanism 3 may "carry over" and incorporate any task or goals that the user identifies with current calendar or task list frameworks. In at least the first embodiment, the processing of the CARRY-OVER module may include the automatic carrying over of all previous tasks and goals not indicated to be accomplished or dropped, or the automatic carrying over of previous tasks and goals specified through the CARRY-OVER data module.

When the processing mechanism 4 completes the organizing of the data into either the calendar framework 4 or the task list framework 5, the user may select the type or types of output calendar and task list 6 to be outputted (Step 111). When the selection is made, the output calendar and task list 6 is then generated by the output mechanism 7 (Step 112).

In the first embodiment, the output mechanism 7 for generating of the output calendar and task list 6 may be implemented through a printer connected to the processing mechanism 3. In the second embodiment, the output calendar and task list 6 may be generated by filling in the blank calendar and task list forms.

Figure 5:
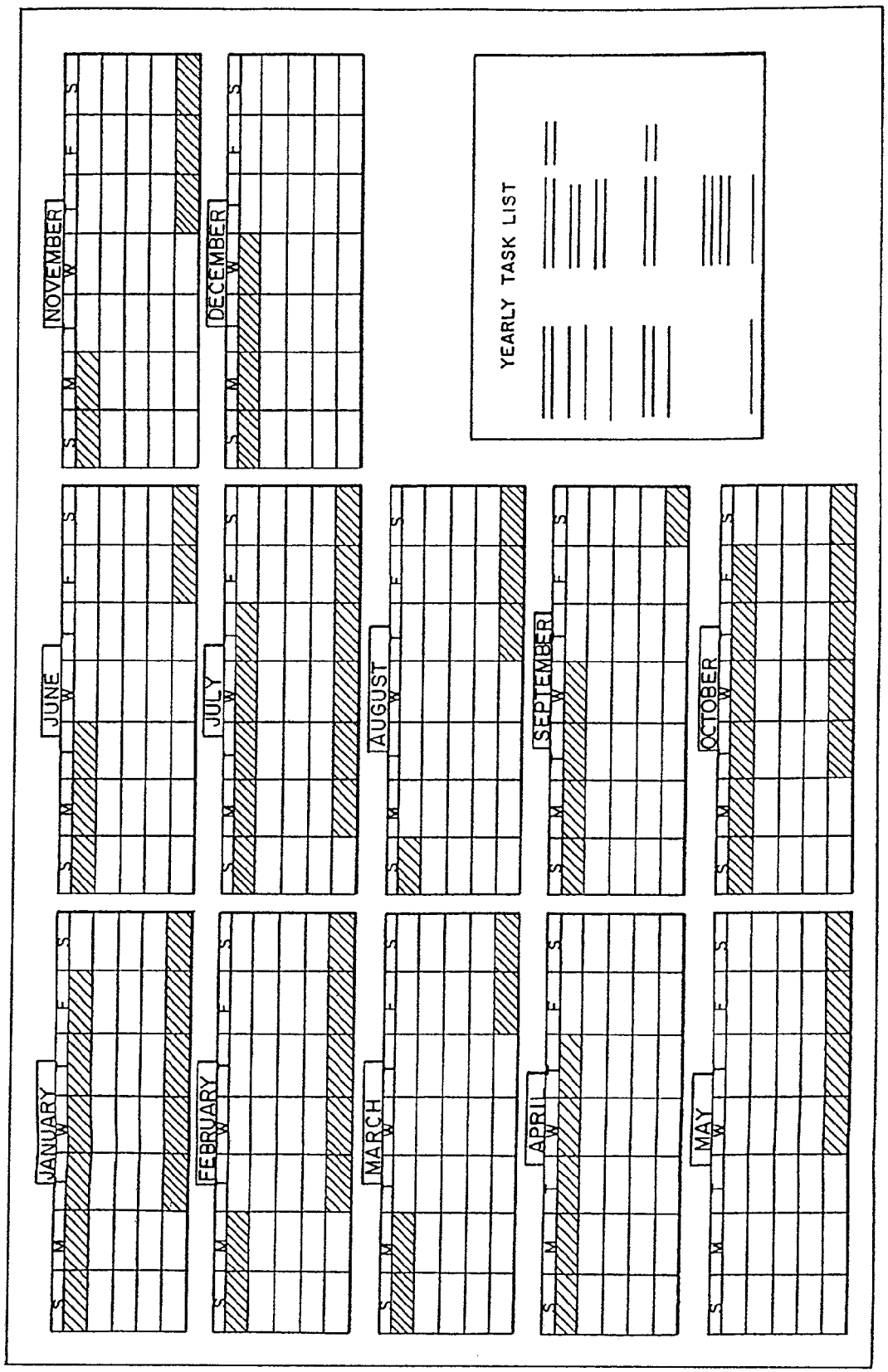
FIG. 5 illustrates an example yearly calendar and task list generated by the system and operation of the invention.

Several examples of output calendar and task lists that may be generated are illustrated in FIGS. 3–5. Specifically, FIG. 3 shows a monthly calendar and task list generated by the processing mechanism 3. FIG. 4 shows a "day planner"-style calendar and task list, while FIG. 5 illustrates a yearly calendar and task list.

Modifications and variations of the above-described embodiments of the present invention are possible, as appreciated by those skilled in the art in light of the above teachings. For example, one modification of at least the first embodiment involves the use of artificial intelligence to generate iterations of the questions in each data module according to prior user inputs. This would allow the invention to provide a wider field of options for the user according to the user's individual needs.

It is therefore to be understood that, within the scope of the appended claims and their equivalents, the invention may be practiced otherwise than as specifically described.

What is claimed is:

1. A computer-implemented method for organizing and planning events, tasks and long-term goals, comprising the steps of:

providing at least one date module for generating data for a specific topic area;

prompting a user to provide data based on said specific topic area of said at least one data module;

categorizing said data inputted by the user into appointment data and task data;

inputting said appointment data into a calendar framework;

inputting said task data into a task list framework; and generating an output calendar and task list based on said calendar and task list frameworks.

* * * * *